United States Patent [19]

Kalvatn

[11] 4,185,803

[45] Jan. 29, 1980

[54] PIVOTABLE ADJUSTMENT MECHANISM

[76] Inventor: Ivar Kalvatn, Aurstad, 6110 Austefjorden, Sunnmore, Norway

[21] Appl. No.: 918,955

[22] Filed: Jun. 26, 1978

Related U.S. Application Data

[63] Continuation of Ser. No. 820,702, Aug. 1, 1977, abandoned.

[30] Foreign Application Priority Data

Aug. 3, 1976 [NO] Norway .................................. 762144

[51] Int. Cl.² .......................... A45D 19/04; A47C 1/02
[52] U.S. Cl. ...................................... 248/608; 297/333
[58] Field of Search ................ 297/333, 314; 248/182, 248/179, 399, 608; 267/131, 154, 157; 16/75

[56] References Cited

U.S. PATENT DOCUMENTS

| 3,360,255 | 12/1967 | Ormond | 267/154 |
| 3,544,159 | 12/1970 | Anderson | 248/608 |

FOREIGN PATENT DOCUMENTS

| 672578 | 5/1952 | United Kingdom | 248/608 |
| 1265035 | 3/1972 | United Kingdom | 248/608 |

*Primary Examiner*—James T. McCall

*Attorney, Agent, or Firm*—Kenyon & Kenyon

[57] ABSTRACT

Pivotable adjustment mechanism is provided for the connection of two mutually moveable members. Such members can be a seat portion and a base support portion of a chair, two cooperating, shaft forming members of an apparatus, a machine, etc. The adjustment mechanism includes two concentric rings suspended according to the cardan principle. The two rings each have a torsion bar disposed along a diameter of and securely fastened to its ring for adjustment of the latter, the two torsion bars being arranged at right angles to each other. A first member is fastened to the outer ring which is suspended by rotatably mounting the ends of its torsion bar in brackets secured to the inner ring which is axially displaced of the outer ring. The inner ring is suspended by rotatably mounting the ends of its torsion bar in a bracket secured to a second member of the chair, apparatus, machine, etc. The torsion bars of the outer ring are secured at their centers against rotation relative to the inner ring and the bracket secured to said second member respectively. This provides a more robust construction with the use of torsion springs which provides a longer lifetime for the springs and less noise in the springs during use.

10 Claims, 3 Drawing Figures

-FIG.2.-

PIVOTABLE ADJUSTMENT MECHANISM

This is a continuation of co-pending application Ser. No. 820,703, filed Aug. 1, 1977, now abandoned.

This invention relates to a pivotable adjustment mechanism for the connection of two mutually moveable members. More particularly, this invention relates to a mechanism mounted between a seat portion and a base support portion of a chair or a mechanism mounted below two shaft forming members of an apparatus with such mechanism including two concentric rings suspended according to the cardan principle.

The invention is applicable in a great number of different apparatus, tools machinery, e.g. in drilling apparatus, in weapons supported by a boat, a vehicle, etc. and in industrial apparatus or machinery. A typical application, discussed below, is in a chair between a seat portion and a base support portion of such chair.

When a chair of the afore-mentioned type is used on board a boat, one is able to sit relatively quietly, in place, during a swell in a desired position in horizontal or substantially horizontal seats whether in head seas or on heeling from side to side. Similar advantages are also achieved in the use of the chair in a road vehicle during driving on uneven ground. Safety on board a boat or in a road vehicle on land is of great importance and, as a consequence of a reduced stress on the user of the chair, there is achieved increased safety in the boat as well as in the road vehicle.

It is known from German Patent Specification No. 127,356, to suspend a chair in the afore-mentioned manner with the aid of the cardan principle. In this case, two crossing pivot shafts are employed which are connected to respective rectangular rings. Each pivot shaft is connected at opposite ends with a respective pair of tension springs which form two opposite sides of each of the two concentric rectangular rings.

An object of this invention is to provide a simpler and more robust constructional solution than the known solution with tension springs.

Another object of the invention is to obtain a longer lifetime for the springs and less noise in the springs of a cardan-suspended apparatus during use.

Briefly, the invention provides a pivotable adjustment mechanism which can be used between various types of relatively moveable members. The adjustment mechanism includes a pair of concentric rings, a first pair of holders fixed to one of the rings at opposite points and a first torsion bar which extends between and is secured to the holders. In addition, a second pair of holders is fixed to the other of the rings at opposite points and a second torsion bar extends between and is secured to this second pair of holders. Also, a pair of brackets are provided on the first ring with extensions which are fixably connected to the second torsion bar while the second pair of holders are pivotally mounted in the brackets.

When used between a pair of mutually moveable members, a bracket is secured to one of the members in order to fix the adjustment mechanism thereto. In this regard, the bracket has a first pair of ears which pivotally mount one of the rings of the mechanism thereon on a pivotal axis which passes through the torsion bar connected to the ring. In addition, the bracket carries a second pair of ears which are releasably secured to the torsion bar. In a similar manner, means are provided to secure the other ring to the other member.

The concentric rings of the adjustment mechanism are suspended according to the cardan principle. Each ring has a torsion bar disposed along its diameter for the adjustment of the ring and the two torsion bars are arranged at right angles to each other.

When assembled, for example, the outer of the two concentric rings is fastened to one of the relatively moveable members and is suspended by rotatably mounting the ends of its torsion bar in the brackets secured to the inner ring. In this regard, the outer ring is mounted in axially displaced relation to the main portion of the inner ring. The inner ring is, in turn, suspended by rotatably mounting the ends of its torsion bar in the brackets secured to the other mutually moveable member. The torsion bar of the outer ring is thus secured at the center against rotation relative to the inner ring while the torsion bar of the inner ring is secured at the center against rotation relative to the bracket secured to the second member.

According to an aspect of the present invention in a preferred embodiment of the invention, the brackets secured to the inner ring have portions which extend inwardly to the center of the torsion bar of the outer ring to abuttingly engage the bar, thereby securing the bar against rotation. The bracket secured to the torsion bar of the inner ring thus secures the latter against rotation.

These and other objects and advantages of the invention will become more apparent from the following detailed description taken in conjunction with the accompanying drawings in which.

Figure 1:
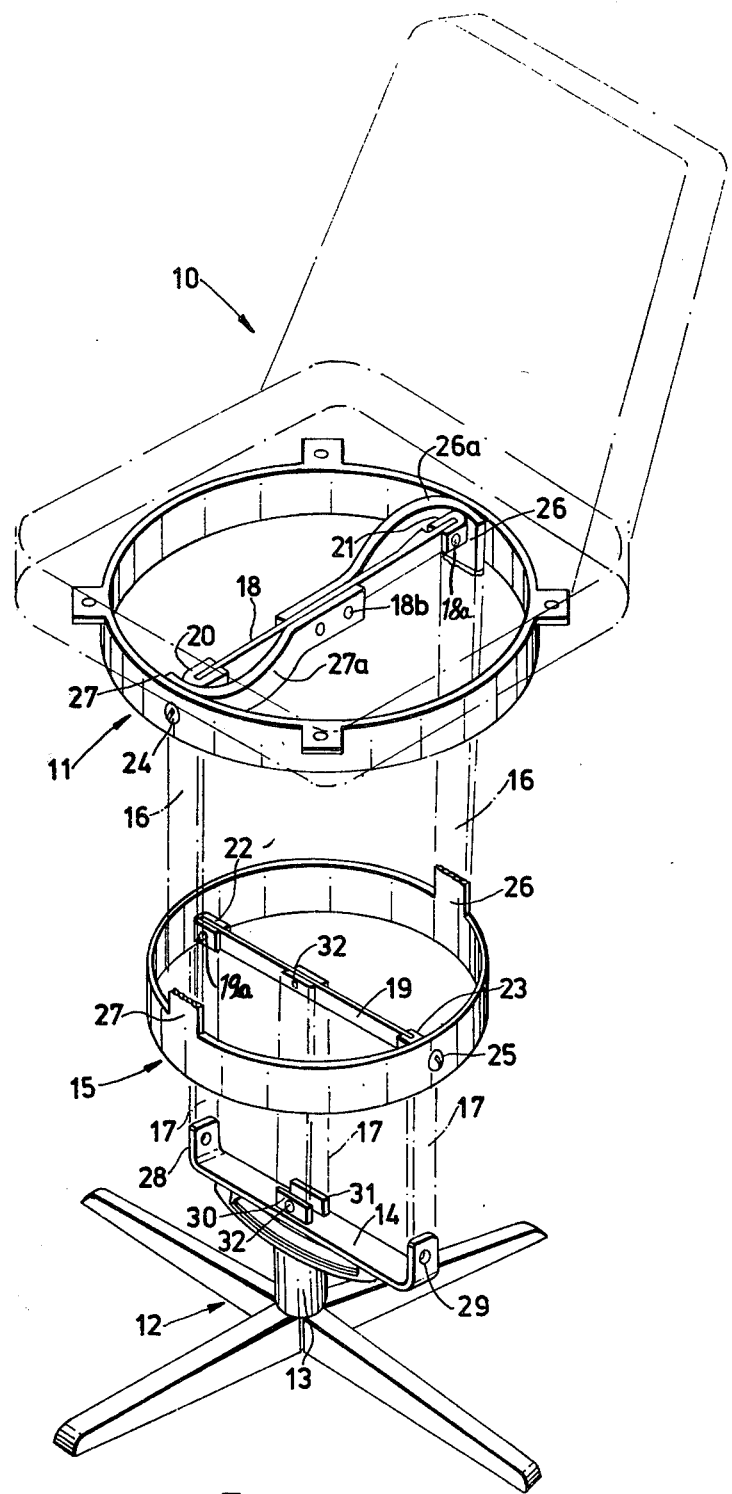
FIG. 1 illustrates a perspective view of a chair using an adjustment mechanism in accordance with the invention with components thereof separated from each other.

Reference in the drawings will be made to the use of the adjustment mechanism on a chair. However, it is to be noted that the adjustment mechanism may be used between any pair of mutually moveable members as noted above.

Referring to FIG. 1, a chair which is constructed with a pair of mutually moveable members such as a seat portion 10 (illustrated in chain lines) and a foot portion 12 is provided with an adjustment mechanism between the members 10, 12 to permit motion between the seat portion 10 and the foot portion 12.

As shown, the seat portion 10 is fastened to an upper, outer ring 11 of the adjustment mechanism while the foot portion 12 supports, via a vertical rotating column 13, a horizontal bracket 14 which, in turn, supports a lower inner ring 15 of the adjustment mechanism. The rings 11 and 15 are, in practice, pushed vertically together and connected to each other as indicated by broken lines 16, while the ring 15 and the bracket 14 are pushed correspondingly vertically together and connected to each other as indicated by the broken lines 17 (see also FIG. 2).

The chair seat portion 10 and the foot portion 12 are illustrated purely by way of example and can be designed in an arbitrarily desired manner in practice.

The rings 11, 15 which extend concentrically relative to each other in a manner known per se are designed as closed, circular rings. The rings 11, 15 are each provided with a diametrically extending torsion bar 18 and 19, respectively, the planes of which cross each other at an angle of 90°. The torsion bars 18, 19 are releasably secured at opposite ends via bolts 18a and 19a in holders 20, 21 and 22, 23, respectively, which are welded, via end pins 24, 25, to their respective associated ring 11, 15.

Figure 2:
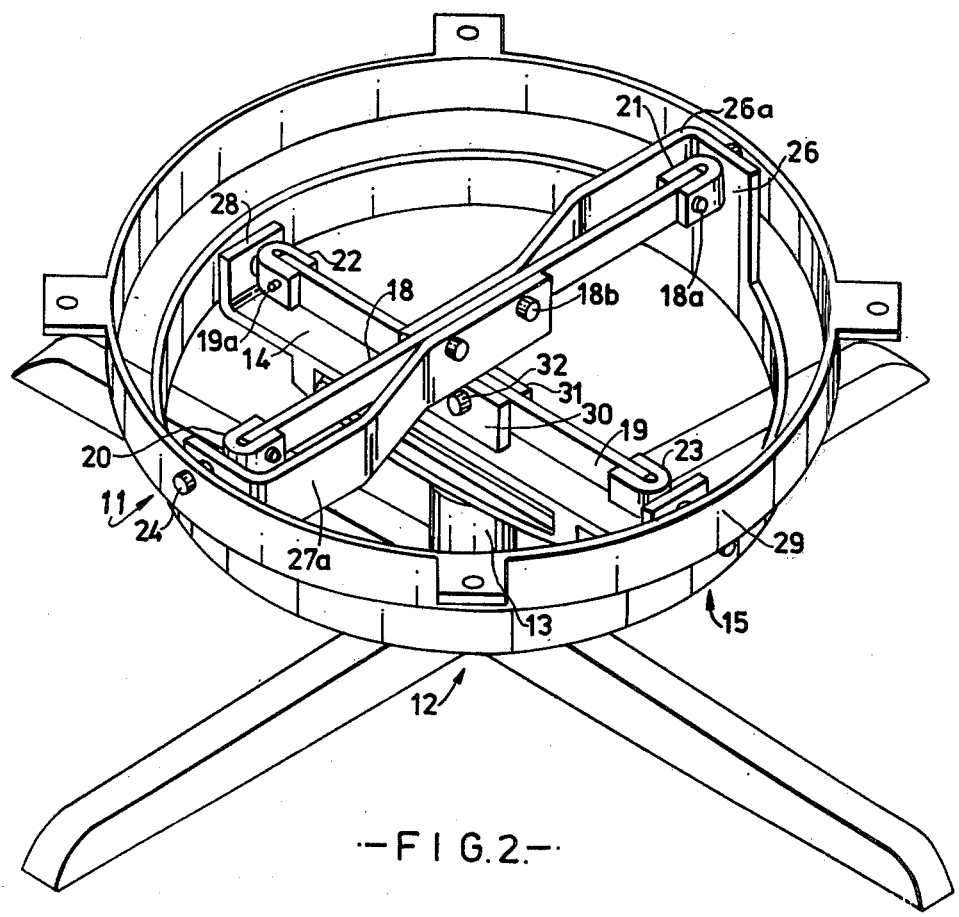
FIG. 2 illustrates a perspective view of the adjustment mechanism mounted on the lower member of a chair.
Figure 3:
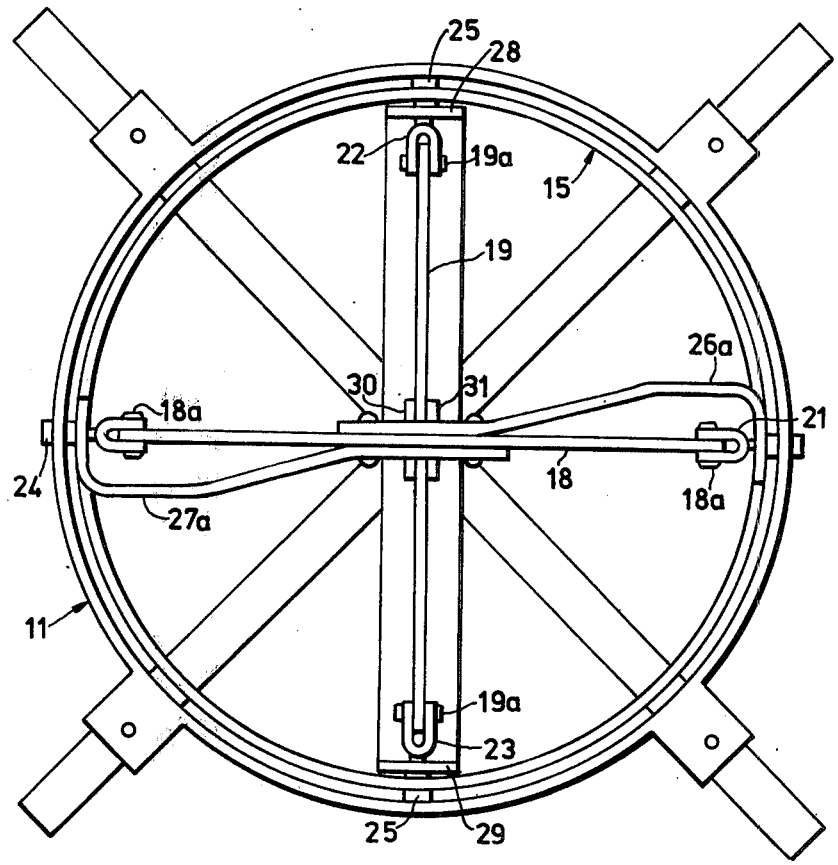
FIG. 3 illustrates a plan view of the adjustment mechanism of FIG. 2.

Referring to FIGS. 2 and 3, the inner ring 15 is provided with a pair of brackets 26, 27 which extend upwardly within the outer ring 11 and form pivotal bearings for the end pins 24. The brackets 26, 27 are disposed between the main portion of the holders 20, 21 and the ring 11 and have support extension portions 26a, 27a which project inwardly into the ring 11 and are fixedly connected via releasable bolts 18b to the torsion bar 18. The ring 11 can consequently be turned over relative to the ring 15 about a pivotal axis through the pins 24, against the spring force of the torsion bar 18.

The bracket 14 has a pair of upwardly extending ears 28, 29 at the ends which pivotally mount the inner ring 15. As shown, the ears 28, 29 are located between the main portion of the holders 22, 23 and the ring 15 and form pivotal bearings for the end pins 25. The torsion bar 19 is, furthermore, fixedly connected to the bracket 15 at a central portion via a pair of fixing ears 30, 31 which project vertically upwards from the bracket 14, and an associated releasable fixing bolt 32, which passes through the fixing ears 30, 31 and the torsion bar 19. The ring 15 can, consequently, be turned over relative to the bracket 14 with the associated foot portion 12 about a pivotal axis through the pins 25, against the spring force of the torsion bar 19.

What is claimed is:

1. A pivotable adjustment mechanism for a pair of mutually moveable members, said mechanism including two concentric rings suspended according to the cardan principle, said mechanism comprising: a torsion bar fastened to each said ring along a diameter thereof for adjustment of said ring, said torsion bars being arranged at right angles to each other;
   the outer of said two concentric rings having a first one of said two mutually moveable members fastened thereto and being suspended by rotatably mounting the ends of its torsion bar in brackets secured to the inner ring;
   said inner ring being axially displaced relative to said outer ring and suspended by rotatably mounting the ends of its torsion bar in a bracket secured to a second one of said two mutually moveable members,
   said torsion bar of said outer ring being secured at its center against rotation relative to the lower ring, and said torsion bar of said inner ring being secured at its center against rotation relative to said bracket secured to said second member.

2. A pivotable adjustment mechanism according to claim 1, wherein said brackets secured to said inner ring have portions extending inwardly to the center of said torsion bar of said outer ring to abuttingly engage said bar, thereby securing the latter against rotation, and said bracket secured to said second member having a portion adapted to abuttingly engage the center of said torsion bar of said inner ring, thereby securing the latter against rotation.

3. A pivotable adjustment mechanism comprising
   a pair of concentric rings;
   a first pair of holders fixed to one of said rings at opposite points thereof;
   a first torsion bar extending between and secured to said holders;
   a second pair of holders fixed to the other of said rings at opposite points thereof;
   a second torsion bar extending between and secured to said second pair of holders; and
   a pair of brackets on said one ring having extensions fixedly connected to said second torsion bar and having said second pair of holders pivotally mounted therein.

4. A pivotable adjustment mechanism as set forth in claim 3 which further comprises a first pair of end pins, each pin being fixedly connected between a respective holder of said first pair of holders and said one ring and a second pair of end pins, each of said latter pins being fixedly connected between a respective holder of said second pair of holders and said other ring.

5. As set forth in claim 4 wherein said second pair of end pins are pivotally mounted in said pair of brackets respectively.

6. As set forth in claim 3 wherein said torsion bars are disposed at right angles to each other.

7. In combination,
   a pair of mutually moveable members; and
   an adjustment mechanism between said members; said mechanism including a pair of concentric rings;
   a first pair of holders fixed to one of said rings at opposite points thereof;
   a first torsion bar extending between and secured to said holders;
   a second pair of holders fixed to the other of said rings at opposite points thereof;
   a second torsion bar extending between and secured to said second pair of holders; and
   a pair of brackets on said one ring having extensions fixedly connected to said second torsion bar and having said second pair of holders pivotally mounted therein;
   a bracket secured to one of said members and having a first pair of ears pivotally mounting said one ring thereon on a pivotal axis passing through said said first torsion bar and a second pair of ears releasably secured to said first torsion bar; and
   means securing said other ring to the other of said members.

8. The combination as set forth in claim 7 wherein said one member is a foot portion of a chair and said other member is a seat portion.

9. The combination as set forth in claim 7 wherein said torsion bars are disposed ar right angles to each other.

10. The combination as set forth in claim 7 wherein said rings are concentric to each other.

* * * * *

UNITED STATES PATENT AND TRADEMARK OFFICE
CERTIFICATE OF CORRECTION

PATENT NO. : 4,185,803

DATED : January 29, 1980

INVENTOR(S) : Ivar Kalvatn

It is certified that error appears in the above-identified patent and that said Letters Patent are hereby corrected as shown below:

Column 1, line 2, change "820,703" to --820,702--

Column 2, line 37, change "the lower member" to --a foot portion--

Column 4, line 58, change "ar" to --at--

Signed and Sealed this

Tenth Day of June 1980

[SEAL]

Attest:

SIDNEY A. DIAMOND

Attesting Officer

Commissioner of Patents and Trademarks